(12) United States Patent
Virtanen (10) Patent No.: US 8,121,543 B2
(45) Date of Patent: Feb. 21, 2012

(54) POWER MANAGEMENT

(75) Inventor: Jukka Tapio Virtanen, Helsinki (FI)

(73) Assignee: Nokia Corporation, Espoo (FI)

( * ) Notice: Subject to any disclaimer, the term of this patent is extended or adjusted under 35 U.S.C. 154(b) by 523 days.

(21) Appl. No.: 12/317,581

(22) Filed: Dec. 26, 2008

(65) Prior Publication Data

US 2010/0167641 A1   Jul. 1, 2010

(51) Int. Cl.
*H04B 5/02*  (2006.01)
(52) U.S. Cl. ...................................................... 455/41.1
(58) Field of Classification Search ................. 455/41.1, 455/41.2, 73, 556.1
See application file for complete search history.

(56) References Cited

U.S. PATENT DOCUMENTS

2008/0162361 A1* 7/2008 Sklovsky et al. ............... 705/65

FOREIGN PATENT DOCUMENTS

| EP | 1 733 080 A2 | 4/2007 |
|---|---|---|
| EP | 1 909 517 A2 | 4/2008 |
| WO | WO 2006/095212 A1 | 9/2006 |

* cited by examiner

*Primary Examiner* — Steven J Mottola
(74) *Attorney, Agent, or Firm* — Harrington & Smith (57) ABSTRACT

An apparatus, a method and a computer program, the apparatus including: an interface configured to detect a first electrical signal, the first electrical signal being provided by a transceiver; secure transaction circuitry having a first power state and a second power state, the secure transaction circuitry being configured, when in the second power state, to perform a transaction, using the transceiver, with a further apparatus; memory circuitry having power states; and control circuitry configured, in response to detecting the first electrical signal, to control the secure transaction circuitry to switch from being in the first power state to being in the second power state, without changing a power state of the memory circuitry.

22 Claims, 5 Drawing Sheets

POWER MANAGEMENT

FIELD OF THE INVENTION

Embodiments of the present invention relate to power management. In particular, they relate to conserving power when using a portable memory apparatus.

BACKGROUND TO THE INVENTION

An electronic device may comprise secure transaction circuitry connected to a near field communication transceiver. If a user places the near field communication transceiver near to a further near field transceiver of a further apparatus, a transaction may be conducted with the further apparatus using the secure transaction circuitry.

BRIEF DESCRIPTION OF VARIOUS EMBODIMENTS OF THE INVENTION

According to various, but not necessarily all, embodiments of the invention there is provided an apparatus, comprising: secure transaction circuitry having a first power state and a second power state, the secure transaction circuitry being configured, when in the second power state, to perform a transaction, using a transceiver, with a further apparatus; memory circuitry having power states; and control circuitry configured to detect a first electrical signal provided by the transceiver and configured, in response to detecting the first electrical signal, to control the secure transaction circuitry to switch from being in the first power state to being in the second power state, without changing a power state of the memory circuitry.

The secure transaction circuitry may be unable, when in the first power state, to perform a transaction with the further apparatus. The first power state of the secure transaction circuitry may be an off state or a standby state.

The memory circuitry may have a first power state and a second power state. The control circuitry may be configured, in response to detecting the first electrical signal, to switch the secure transaction circuitry from being in the first power state to being in the second power state, without changing the memory circuitry from being in the first power state to being the second power state.

The memory circuitry may be configured, when in the second power state, to be written to and read from, and the memory may be unable, when in the first power state, to be written to and read from. The first power state of the memory circuitry may be a standby power state.

The secure transaction circuitry may comprise secure transaction memory circuitry, different to the memory circuitry. The secure transaction memory circuitry may store transaction data for use in performing a transaction.

The secure transaction circuitry may comprise a secure transaction controller. The control circuitry may be the secure transaction controller. Alternatively, the control circuitry may be a memory controller, different to the secure transaction controller. The memory controller may be configured to control reading and writing of data to the memory circuitry.

The first electrical signal may be a wakeup signal for instructing switching of the secure transaction circuitry from the first power state to the second power state. Alternatively, the first electrical signal may be a signal for use by the secure transaction circuitry in performing the transaction.

The first electrical signal may be provided in response to the transceiver detecting a wireless signal. The transceiver may be a near field communication transceiver.

The apparatus may be comprised in an integrated circuit. The apparatus may be a portable memory apparatus. The portable memory apparatus may comprise a housing that is configured to be insertable into a receptacle of an electronic device by a user, without the use of a tool, and configured to be removable from the receptacle of the electronic device by a user, without the use of a tool.

According to various, but not necessarily all, embodiments of the invention there is provided a method, comprising: detecting a first electrical signal provided by a transceiver; and switching, in response to detecting the first electrical signal, secure transaction circuitry of an apparatus from being in a first power state to being in a second power state, without switching a power state of memory circuitry of the apparatus, wherein when the secure transaction circuitry is in the second power state, it is configured to perform a transaction, using the transceiver, with a further apparatus.

The secure transaction circuitry may be unable, when in the first power state, to perform a transaction with the further apparatus. The first power state of the secure transaction circuitry may be an off state or a standby state.

The memory circuitry may have a first power state and a second power state. The secure transaction circuitry may be switched from being in the first power state to being in second power state, without changing the memory circuitry from being in the first power state to being in the second power state.

The memory circuitry may be able, when in the second power state, to be written to and read from, and the memory circuitry may be unable, when in the first power state, to be written to and read from. The first power state of the memory circuitry may be an off state or a standby state.

Switching of the secure transaction circuitry from the first power state to the second power state may be performed by a secure transaction controller of the secure transaction circuitry. Alternatively, switching of the secure transaction circuitry from the first power state to the second power state may be performed by a memory controller of the apparatus, different to the secure transaction controller.

According to various, but not necessarily all, embodiments of the invention there is provided a computer program comprising instructions which, when executed by a processor, enable: detecting a first electrical signal provided by a transceiver; and switching, in response to detecting the first electrical signal, secure transaction circuitry of an apparatus from being in a first power state to being in a second power state, without switching a power state of memory circuitry of the apparatus, wherein when the secure transaction circuitry is in the second power state, it is configured to perform a transaction, using the transceiver, with a further apparatus.

The secure transaction circuitry may be unable, when in the first power state, to perform a transaction with the further apparatus. The first power state of the secure transaction circuitry may be an off state or a standby state.

The memory circuitry may have a first power state and a second power state. The secure transaction circuitry may be switched from being in the first power state to being in second power state, without changing the memory circuitry from being in the first power state to being the second power state.

The memory circuitry may be able, when in the second power state, to be written to and read from. The memory circuitry may be unable, when in the first power state, to be written to and read from. The first power state of the memory circuitry may be an off state or a standby state.

The switching of the secure transaction circuitry from the first power state to the second power state may be performed by a secure transaction controller of the secure transaction circuitry. Alternatively, the switching of the secure transaction circuitry from the first power state to the second power state may be performed by a memory controller of the portable memory apparatus, different to the secure transaction circuitry.

According to various, but not necessarily all, embodiments of the invention there is provided an apparatus, comprising: means for detecting a first electrical signal, the first electrical signal being provided by a transceiver; secure transaction means having a first power state and a second power state, the secure transaction means being for performing, when in the second power state, a transaction, using the transceiver, with a further apparatus; memory means having power states; and means for controlling, in response to detection of the first electrical signal, the secure transaction means to switch from being in the first power state to being in the second power state, without changing a power state of the memory means.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The Figures illustrate an apparatus 10, comprising: secure transaction circuitry 20 having a first power state and a second power state, the secure transaction circuitry 20 being configured, when in the second power state, to perform a transaction, using a transceiver 16, with a further apparatus 70; memory circuitry 14 having power states; and control circuitry 12/13/22 configured to detect a first electrical signal provided by the transceiver 16 and configured, in response to detecting the first electrical signal, to control the secure transaction circuitry 22 to switch from being in the first power state to being in the second power state, without changing a power state of the memory circuitry 14.

Figure 1:
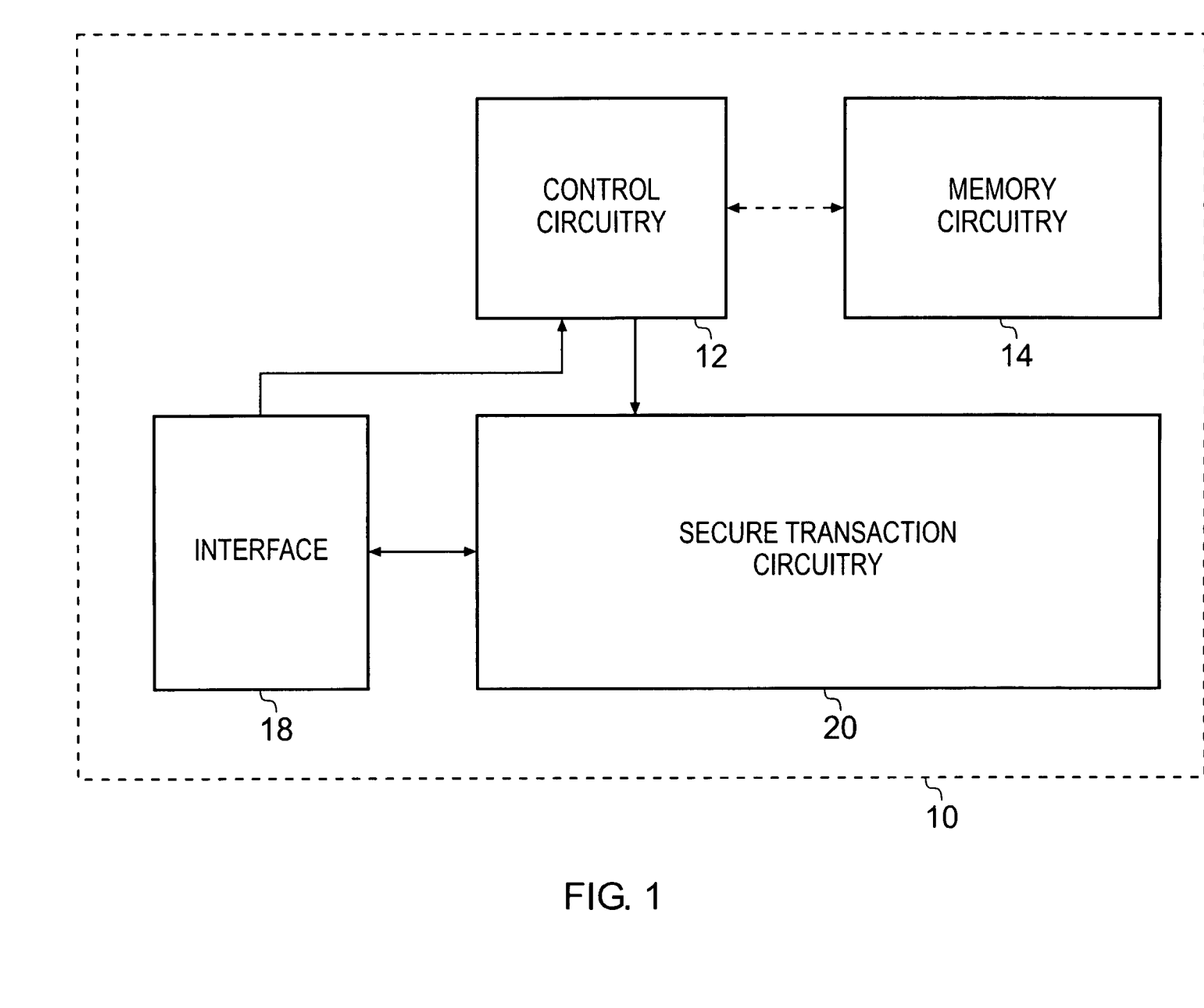
FIG. 1 illustrates a first, general, schematic of an apparatus.

FIG. 1 illustrates a general schematic of an apparatus 10. The apparatus may be a portable memory apparatus. The portable memory apparatus 10 may, for example, be a hand portable memory stick/card. In some embodiments of the invention, the portable memory apparatus 10 may be a Micro Secure Digital (SD) card.

The portable memory apparatus 10 may, for example, comprise a housing that is configured to be insertable into a receptacle of an electronic device by a user without the use of a tool and be removable from the receptacle of the electronic device by a user without the use of a tool. For example, the receptacle may be a slot in the electronic device.

The apparatus 10 illustrated in FIG. 1 comprises control circuitry 12, memory circuitry 14, an interface 18 and secure transaction circuitry 20. The secure transaction circuitry 20 may be "secure" because it is tamper-resistant. The tamper resistivity of the secure transaction circuitry 20 may be provided by the physical/mechanical properties of the secure transaction circuitry 20 or the physical/mechanical properties of a housing of the secure transaction circuitry 20. Additionally or alternatively, tamper resistivity may be provided by encryption of data and/or computer program instructions stored in secure transaction memory circuitry of the secure transaction circuitry 20.

The apparatus 10 may, for example, comprise a housing that houses some or all of the control circuitry 12, the memory circuitry 14, the interface 18 and the secure transaction circuitry 20.

Figure 2:
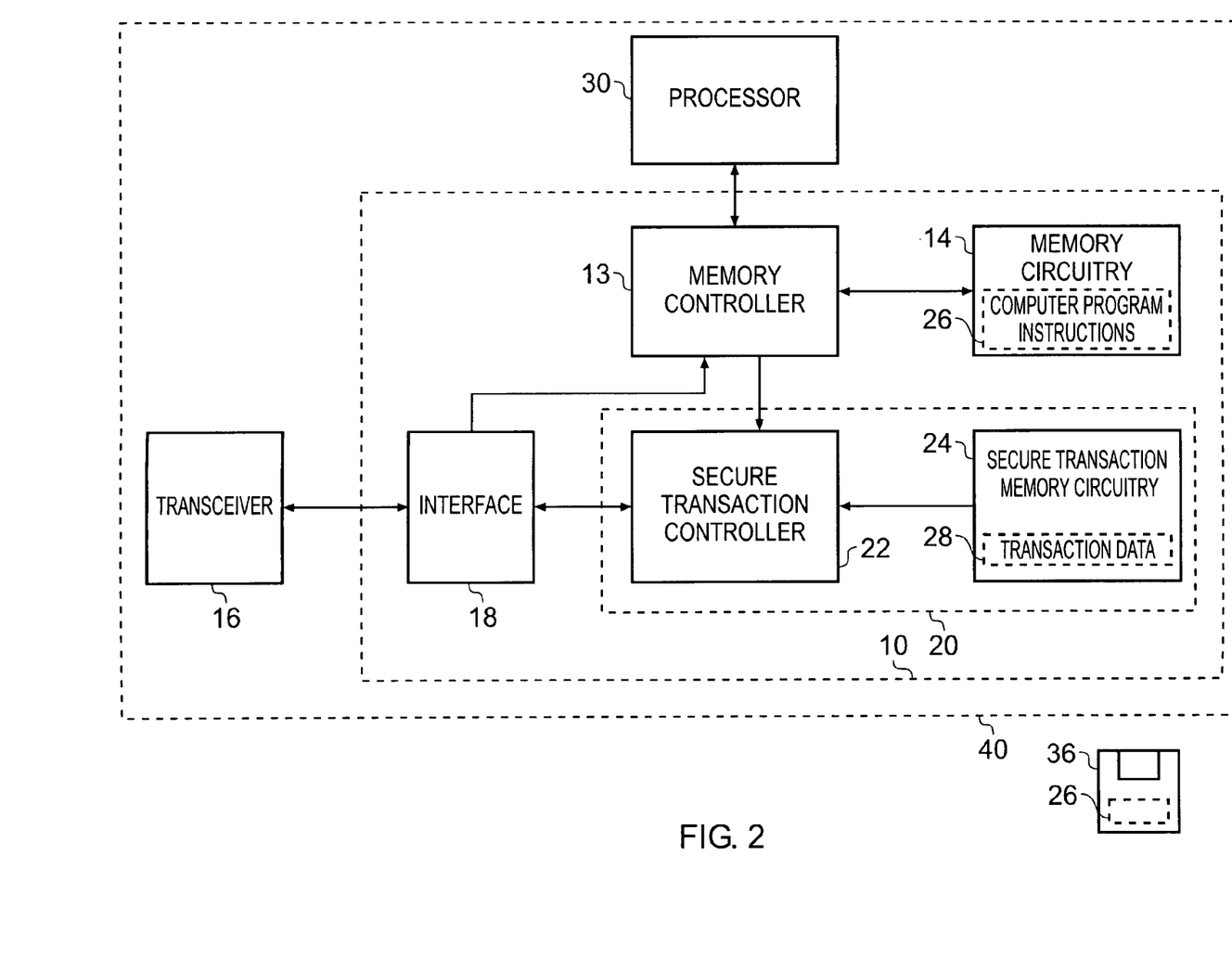
FIG. 2 illustrates a second schematic of an apparatus.

FIG. 2 illustrates an electronic device 40. The electronic device 40 may be a hand portable electronic device such as a mobile telephone, a personal digital assistant or a personal music player. The electronic device 40 comprises a portable memory apparatus 10 in accordance with embodiments of the invention. The schematic of the portable memory apparatus 10 in FIG. 2 is a more detailed version of that illustrated in FIG. 1.

The electronic device 40 comprises a processor 30 and a transceiver 16. The processor 30 and the transceiver 16 are not, in this example, part of the portable memory apparatus 10.

The processor 30 may, for example, be a central processor of the electronic device 40. The transceiver 16 may, for example, be a wireless near field communication transceiver. Alternatively, the transceiver 16 may be a short range wireless radio transceiver that operates in accordance with a 802.11g or Bluetooth protocol.

The portable memory apparatus 10 illustrated in FIG. 2 comprises a memory controller 13, memory circuitry 14, an interface 18, a secure transaction controller 22 and secure transaction memory circuitry 24.

The transceiver 16 is connected to the secure transaction controller 22 by an interface 18. The interface 18 may, for instance, comprise a single control line, or a plurality of control lines. For example, the interface 18 may be an $S^2C$ interface (described in the standard ECMA-373, and also known as NFC-WI) comprising a SIGOUT control line from the transceiver 16 to the secure transaction controller 22 and a SIGIN control line from the secure transaction controller 22 to the transceiver 16. Alternatively, the interface 18 may be a single wire protocol (SWP) interface.

The portable memory apparatus 10 of the example embodiment of the invention illustrated in FIG. 2 relates to the portable memory apparatus illustrated in FIG. 1 in that the control circuitry 12 illustrated in FIG. 1 can be considered to be the memory controller 13 illustrated in FIG. 2.

The memory controller 13 is configured to receive an input from and provide an output to the processor 30, and to write to and read from the memory circuitry 14. The processor 30 may, for example, write data to the memory circuitry 14 using the memory controller 13. The memory controller 13 may, for example, be implemented using one or more field-programmable gate arrays (FPGA), application specific integrated circuits (ASIC), or software programmable processors.

The memory controller 13 is also configured to detect inputs provided by the transceiver 16 on the interface 18, and to provide an output to the secure transaction controller 22.

The secure transaction controller 22 and the secure transaction memory circuitry 24 can collectively be considered to be secure transaction circuitry 20 (as illustrated in FIG. 1).

The secure transaction controller 22 is configured to read from the secure transaction memory circuitry 24. The secure transaction controller 22 may be implemented using one or more FPGAs, ASICs, or software programmable processors.

The secure transaction memory circuitry 24 illustrated in FIG. 2 stores transaction data 28. The transaction data 28 may, for example, comprise user payment details such as a user's credit card or debit card details. Although the secure transaction memory circuitry 24 is illustrated as a single component, it may be implemented as one or more separate components. The transaction data 28 may also comprise a password. A user may be asked to enter the password in order to confirm payment should be made using his payment details.

The memory circuitry 14 is general purpose, non-volatile memory circuitry that may be used to store data. The memory circuitry 14 may, for example, be flash memory. Although the memory circuitry 14 is illustrated as a single component, it may be implemented as one or more separate components.

The memory circuitry 14 illustrated in FIG. 2 stores computer program instructions 26. The computer program instructions 26 control the operation of the portable memory apparatus 10 when loaded into the memory controller 13. The computer program instructions 26 provide the logic and routines that enables the portable memory apparatus 10 to perform the method illustrated in FIG. 4. The memory controller 13 is able, by reading the memory circuitry 14, to load and execute the computer program instructions 26.

The computer program may arrive at the portable memory apparatus 13 via any suitable delivery mechanism 36. The delivery mechanism 36 may be, for example, a computer-readable storage medium, a computer program product, a memory device, a record medium such as a CD-ROM or DVD, an article of manufacture that tangibly embodies the computer program instructions 26. The delivery mechanism 36 may be a signal configured to reliably transfer the computer program instructions 26. The electronic device 40 may propagate or transmit the computer program instructions 26 as a computer data signal.

The elements illustrated in FIG. 2 are operationally coupled and any number or combination of intervening elements can exist (including no intervening elements).

An example of a method in accordance with a first embodiment of the invention will now be described with reference to FIGS. 2, 3 and 4. In this exemplary method, the transceiver 16 is a near field communication transceiver.

Figure 3:
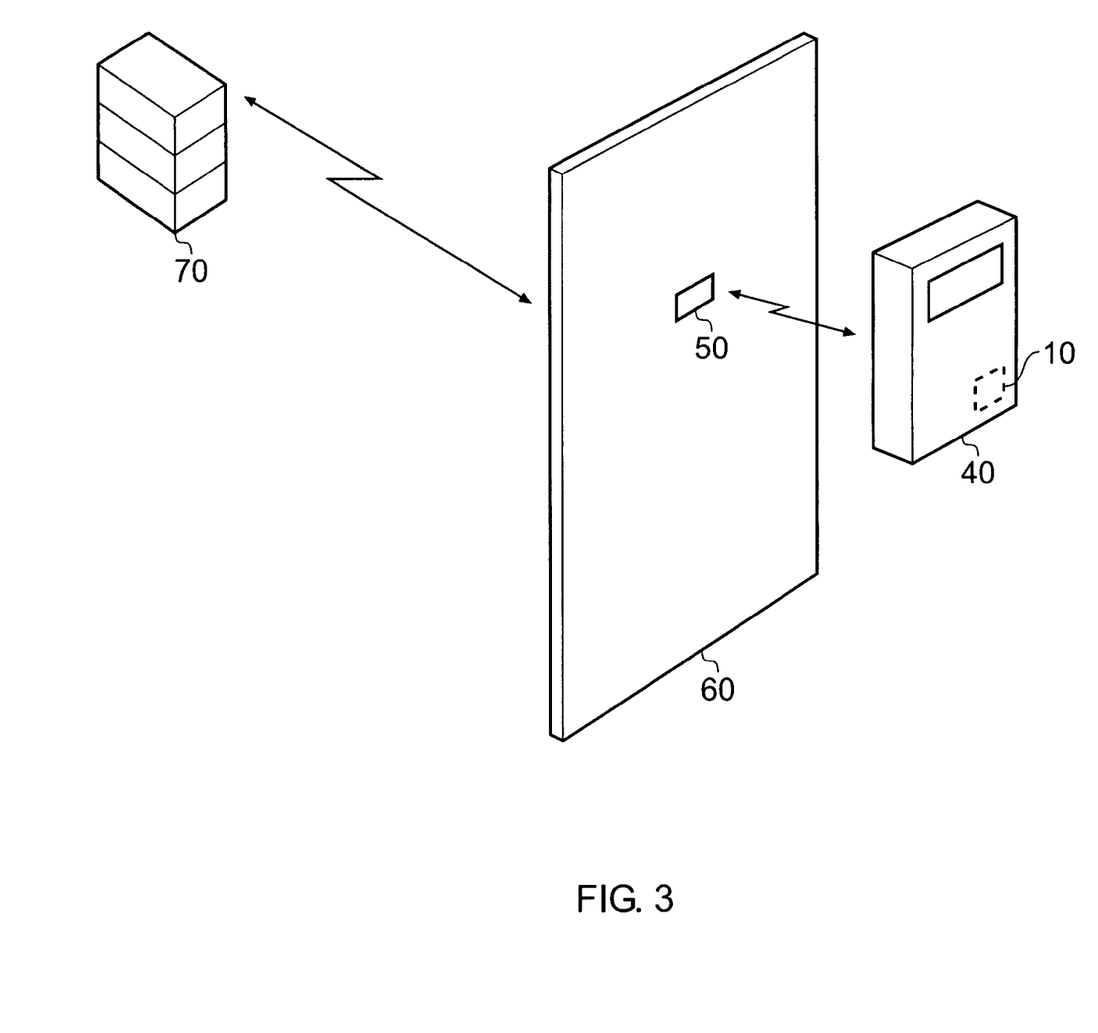
FIG. 3 illustrates an electronic device communicating with a server.

FIG. 3 illustrates an electronic device 40, a first apparatus 60 and a second apparatus 70. The electronic device 40 comprises a portable memory apparatus 10. The first apparatus 60 comprises a near field communication transceiver 50. In this example, the first apparatus 60 enables a user to pay for transportation tickets (for example, train tickets). The first apparatus 60 is connected to a second apparatus 70. For instance, the second apparatus 70 may be a transaction server.

A user places the electronic device 40 near the near field communication transceiver 50 of the first apparatus 60 in order to pay for transportation.

Before the user places the electronic device 40 next to the apparatus 60, the portable memory apparatus 10 is inactive and in a first, standby, power state. That is, each of the memory controller 13, the memory circuitry 14 and the secure transaction circuitry 20 are in a first, standby, power state.

When the memory circuitry 14 is in the standby power state, the memory circuitry 14 is unable to be written to or read from. When the memory is in an active power state, the memory circuitry 14 is able to be written to and read from. The memory circuitry 14 is not able to be in both the standby power state and the active power state at the same time. The memory circuitry 14 consumes more power when it is in the active power state than when it is in the standby power state.

When the secure transaction circuitry 20 is in the standby power state, the secure transaction circuitry 20 is unable to perform a transaction with an apparatus. When the secure transaction circuitry 20 is in an active power state, the secure transaction circuitry 20 is able to perform a transaction with an apparatus. The transaction may or may not be secure (for example, the transaction may or may not be encrypted).

As mentioned above, the secure transaction circuitry 20 comprises a secure transaction controller 22 and secure transaction memory circuitry 24. Neither the secure transaction controller 22 nor the secure transaction memory circuitry 24 may be in the standby power state and the active power state at the same time. The secure transaction circuitry 20 consumes more power when it is in the active power state than when it is in the standby power state.

Upon placement of the electronic device 40 near to the apparatus 60, communication between the near field communication transceiver 16 of the electronic device 40 and the near field communication transceiver 50 of the apparatus 60 is initiated by either the apparatus 60 or the electronic device 40. In this example, the apparatus 60 initiates communication between the apparatus 60 and the electronic device 40. It controls the near field communication transceiver 50 to transmits a magnetic signal to the electronic device 40. The magnetic signal includes connection data for use in establishing a connection between the secure transaction circuitry 20 of the electronic device 40 and the transaction server 70.

In response to detecting the magnetic signal, the near field communication transceiver 16 of the electronic device 40 provides an electrical signal on the interface 18. In this example, the electrical signal is a wakeup signal that instructs switching of the secure transaction circuitry 20 from being in the first, standby, power state to being in a second, active, power state.

In this example embodiment of the invention, when the secure transaction circuitry 20 is in the first, standby, power state, the secure transaction controller 22 is not responsive to electrical signals on the interface 18. However, when the memory controller 13 is in the first, standby, power state, it is responsive to electrical signals on the interface 18.

Figure 4:
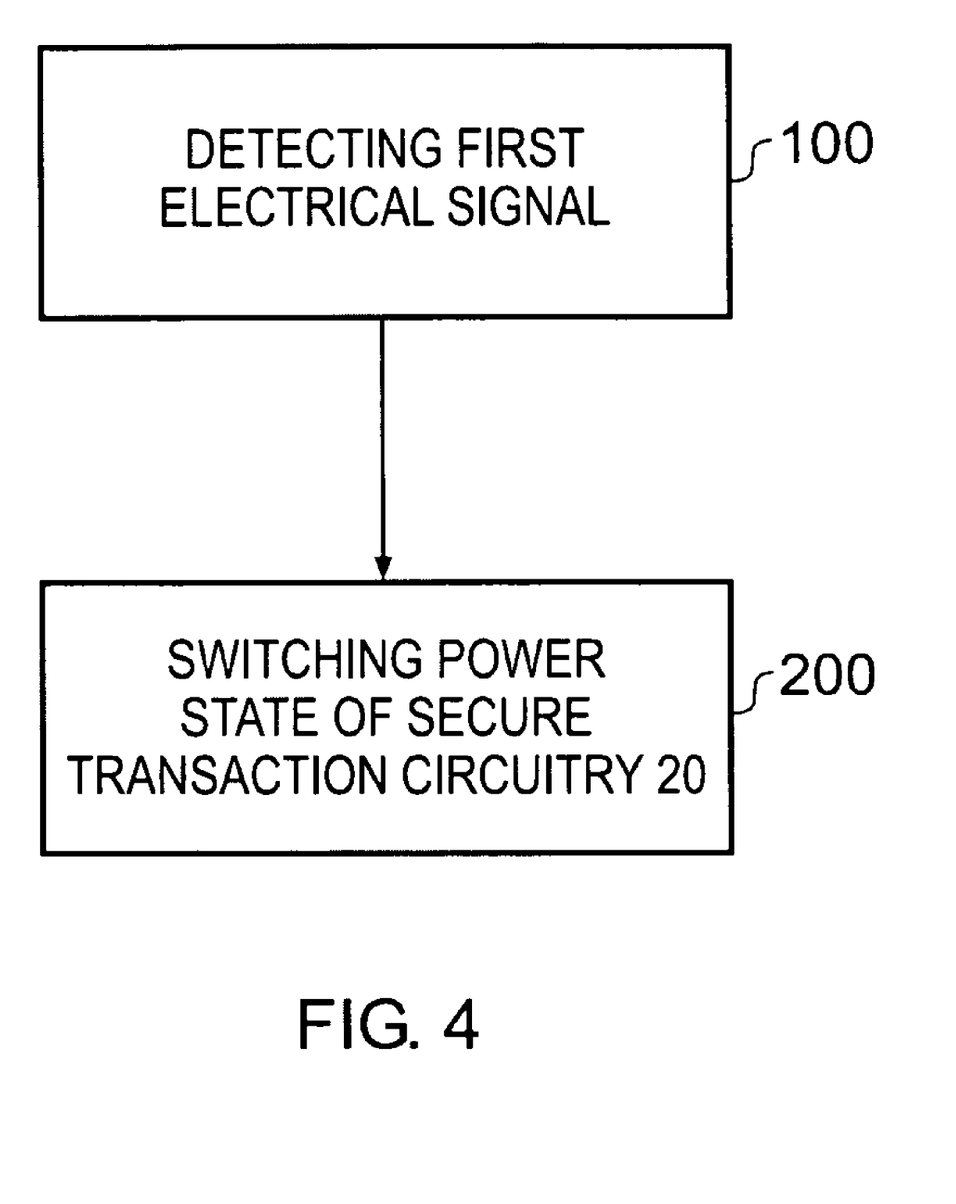
FIG. 4 illustrates a method.

At block 100 of FIG. 4, the memory controller 13 detects the wakeup signal. In response to receiving the wakeup signal, the memory controller 13 switches from being in the first, standby, power state to being in the second, active, power state.

At block 200 of FIG. 4, the memory controller 13 provides a signal to the secure transaction controller 22, in order to switch the secure transaction circuitry 22 from being in the first, standby, power state to being in the second, active, power state.

However, the memory controller 13 does not provide a signal to the memory circuitry 14 to switch the current power state of the memory circuitry 14. The memory circuitry 14 instead remains in the standby power state.

The near field communication transceiver 16 then provides a second electrical signal on the interface 18. The second electrical signal includes at least some of the connection data provided in the magnetic field from the near field communication transceiver 50.

The secure transaction controller 22, in its active power state, detects the second electrical signal containing at least some of the connection data, and proceeds to establish a connection with the transaction sever 70. Once an appropriate connection between the secure transaction circuitry 20 of the electronic device 40 and the transaction server 70 has been established, the secure transaction controller 22 performs a transaction with the transaction server 70.

For example, the transaction may be a payment transaction. When performing a payment transaction, the secure transaction controller 22 may provide the user payment details stored in the secure transaction memory circuitry 24 to the transaction server 70.

Once the transaction server 70 has received the user's payment details, it sends an acknowledgement to the first apparatus 60. The near field communication transceiver 50 of the first apparatus 60 provides the acknowledgement to the near field transceiver 16 of the electronic device 40.

In response to receiving the acknowledgement, the near field communication transceiver 16 provides a third electric signal on the interface 18. The memory controller 13 detects the third electrical signal and, in response, switches the secure transaction circuitry 20 from being in the second, active, power state to being in the first, standby, power state. The memory controller 13 may then switch itself from being in the second, active, power state to being in the first, standby, power state. The transaction with the transaction server 70 is now complete.

It should be appreciated that the some embodiments of the invention may differ from that described above in a number of ways. Firstly, the first power state for the secure transaction circuitry 20 and/or the memory circuitry 14 may not be a standby power state. Instead, it may be an off state, in which the secure transaction circuitry 20 and/or the memory circuitry 14 receive no power.

Secondly, the near field communication transceiver 16 need not provide a specific wakeup signal on the interface 18 in response to detecting a magnetic field. If no specific wakeup signal is provided, the memory controller 13 may switch the secure transaction circuitry 20 to being in the active power state in response to detecting any electrical signal on the interface 18.

For example, in response to detecting the magnetic field, the near field communication transceiver 16 may provide an electrical signal including connection data that is received by the transceiver 16 and is for establishing a connection between the secure transaction circuitry 20 and another apparatus (which may be, for example, the transaction server 70). The memory controller 13 may switch the secure transaction circuitry 20 into the active power state in response to detecting that electrical signal.

The memory controller 13 may also be configured to switch the secure transaction circuitry 20 from being in the active power state to being in the standby or off state if the magnetic field from the transceiver 50 of the first apparatus 60 ceases to be present. In this regard, the near field communication transceiver 16 may provide an appropriate electrical signal on the interface indicating that a magnetic field is no longer being detected by the transceiver 16. This electrical signal may be unrecognisable to the secure transaction controller 22 and thus be ignored by it. The memory controller 13, however, may be configured to detect the electrical signal and switch the secure transaction circuitry 20 from being in the active power state to being in the standby or off state.

Figure 5:
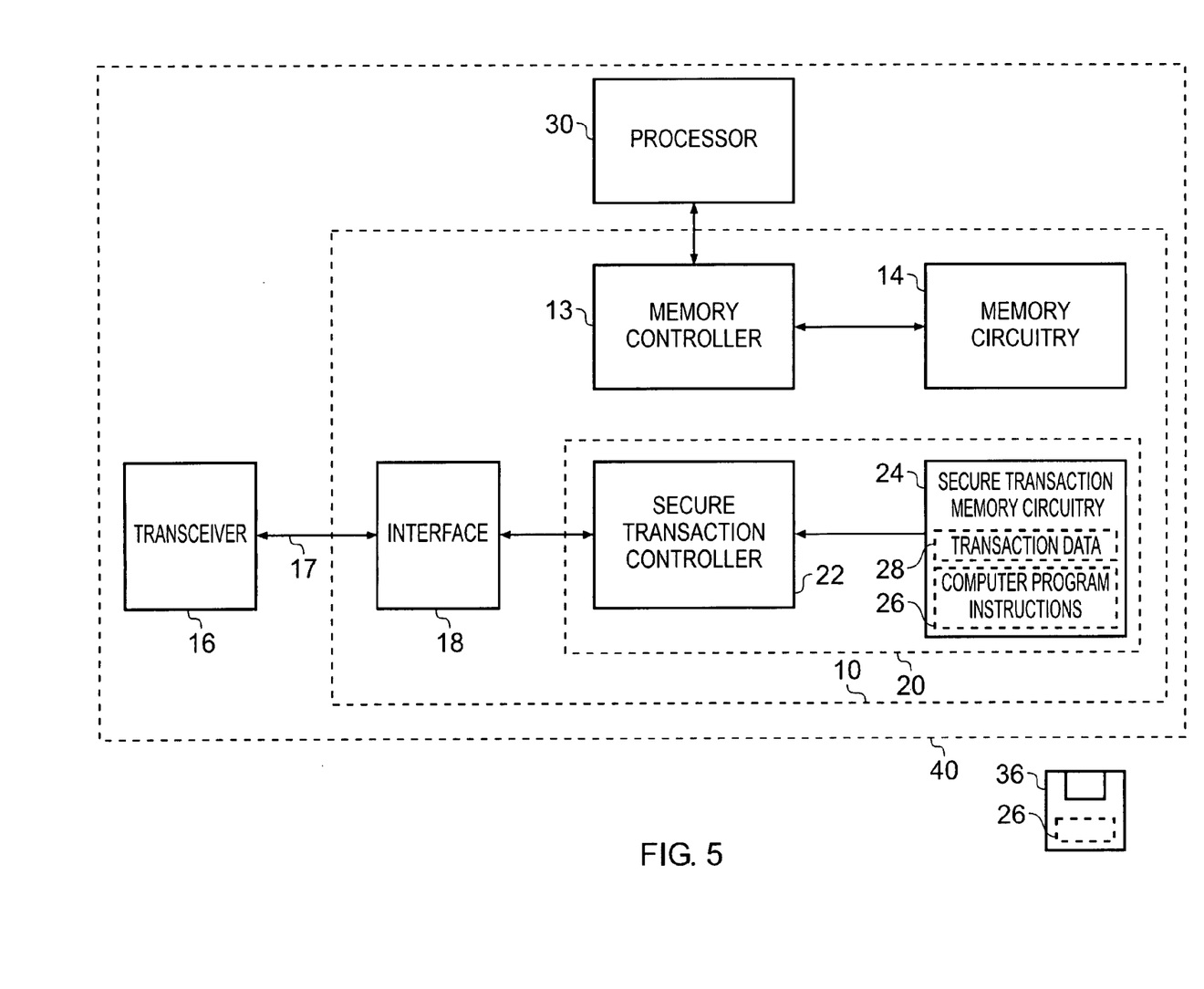
FIG. 5 illustrates a third schematic of an apparatus.

FIG. 5 illustrates an electronic device 40 comprising a portable memory apparatus 10 in accordance with another example embodiment of the invention. The portable memory apparatus 10 illustrated in FIG. 5 differs from that in FIG. 2 in that the control circuitry 12 (see FIG. 1) is provided by the secure transaction controller 22 rather than the memory controller 13.

That is, switching of the secure transaction circuitry 20 from the first power state to the second active power state (and vice versa) is controlled by the secure transaction controller 22 in the FIG. 5 example embodiment of the invention, rather than by the memory controller 13. Computer program instructions 26 that control the operation of the secure transaction controller 22 may be stored in the secure transaction memory circuitry 24.

In the embodiments of the invention described above, control circuitry 12 is used to switch secure transaction circuitry 20 from being in a standby or off power state to being in an active power state, without changing a power state of the memory circuitry 14. Advantageously, this means that power can be conserved because the memory circuitry 14 may remain in a standby or off power state when the secure transaction circuitry 20 is switched into the active power state.

Also, advantageously, power is conserved because the main processor 30 (which is typically relatively power hungry) need not be switched from a standby power state to an active power state when switching the secure transaction circuitry 20 into an active power state, because the switching is handled from within the portable memory apparatus 10 rather than by the main processor 30.

The blocks illustrated in FIG. 4 may represent steps in a method and/or sections of code in the computer program instructions 26. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, there need not be a separate transaction server 70. Instead, the functions of the server 70 may be carried out by the first apparatus 60.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus, comprising:
   secure transaction circuitry having a first power state and a second power state, the secure transaction circuitry being configured, when in the second power state, to perform a transaction, using a transceiver, with a further apparatus;
   memory circuitry, different from the secure transaction circuitry, having power states; and
   a memory controller, different from the secure transaction circuitry, configured to control writing of data to the memory circuitry and reading of data from the memory circuitry, wherein the memory controller is configured to detect a first electrical signal provided by the transceiver and configured, in response to detecting the first electrical signal, to control the secure transaction circuitry to switch from being in the first power state to being in the second power state, without changing a power state of the memory circuitry.

2. An apparatus as claimed in claim 1, wherein the secure transaction circuitry is unable, when in the first power state, to perform a transaction with the further apparatus.

3. An apparatus as claimed in claim 1, wherein the first power state of the secure transaction circuitry is an off state or a standby state.

4. An apparatus as claimed in claim 1, wherein the memory circuitry has a first power state and a second power state, and wherein the memory controller is configured, in response to detecting the first electrical signal, to switch the secure transaction circuitry from being in the first power state to being in the second power state without changing the memory circuitry from being in the first power state to being the second power state.

5. An apparatus as claimed in claim 4, wherein the memory circuitry is configured, when in the second power state, to be written to and read from, and the memory is unable, when in the first power state, to be written to and read from.

6. An apparatus as claimed in claim 5, wherein the first power state of the memory circuitry is an off state or a standby state.

7. An apparatus as claimed in claim 1, wherein the secure transaction circuitry comprises secure transaction memory circuitry, different from the memory circuitry, and the secure transaction memory circuitry stores transaction data for use in performing a transaction.

8. An apparatus as claimed in claim 1, wherein the first electrical signal is a wakeup signal for instructing switching of the secure transaction circuitry from the first power state to the second power state.

9. An apparatus as claimed in claim 1, wherein the first electrical signal is provided in response to the transceiver detecting a wireless signal.

10. An apparatus as claimed in claim 1, wherein the transceiver is a near field communication transceiver.

11. An integrated circuit comprising an apparatus as claimed in claim 1.

12. An apparatus as claimed in claim 1, wherein the apparatus is a portable memory apparatus.

13. An electronic device comprising the portable memory apparatus as claimed in claim 12, the electronic device further comprising a receptacle configured to receive the portable memory apparatus.

14. A method, comprising:
    detecting, at a memory controller, a first electrical signal provided by a transceiver, wherein the memory controller is configured to control writing of data to memo circuit and reading of data from the memory circuitry; and
    using the memory controller to respond to detection of the first electrical signal by switching secure transaction circuitry, different from the memory controller and the memory circuitry, from being in a first power state to being in a second power state, without switching a power state of the memory circuitry, wherein when the secure transaction circuitry is in the second power state, it is configured to perform a transaction using the transceiver.

15. A method as claimed in claim 14, wherein the secure transaction circuitry is unable, when in the first power state, to perform a transaction using the transceiver.

16. A method as claimed in claim 14, wherein the memory circuitry has a first power state and a second power state, and the secure transaction circuitry is switched from being in the first power state to being in second power state without changing the memory circuitry from being in the first power state to being the second power state.

17. A method as claimed in claim 16, wherein the memory circuitry is able, when in the second power state, to be written to and read from, and the memory circuitry is unable, when in the first power state, to be written to and read from.

18. A non-transitory computer readable medium storing a computer program comprising instructions which, when executed by a processor, enable:
    detecting, at a memory controller, a first electrical signal provided by a transceiver, wherein the memory controller is configured to control writing of data to memory circuitry and reading of data from the memory circuitry; and
    using the memory controller to respond to detection of the first electrical signal by switching secure transaction circuitry, different from the memory controller and the memory circuitry, from being in a first power state to being in a second power state, without switching a power state of the memory circuitry, wherein when the secure transaction circuitry is in the second power state, it is configured to perform a transaction using the transceiver.

19. A non-transitory computer readable medium as claimed in claim 18, wherein the secure transaction circuitry is unable, when in the first power state, to perform a transaction using the transceiver.

20. A non-transitory computer readable medium as claimed in claim 18, wherein the memory circuitry has a first power state and a second power state, and the secure transaction circuitry is switched from being in the first power state to being in second power state without changing the memory circuitry from being in the first power state to being the second power state.

21. A non-transitory computer readable medium as claimed in claim 20, wherein the memory circuitry is able, when in the second power state, to be written to and read from, and the memory circuitry is unable, when in the first power state, to be written to and read from.

22. An apparatus, comprising:
    secure transaction means having a first power state and a second power state, the secure transaction means being for performing, when in the second power state, a transaction, using a transceiver, with a further apparatus;
    memory means, different from the secure transaction means, having power states; and
    memory controller means, different from the secure transaction circuitry, for controlling writing of data to the memory means and reading of data from the memo means, wherein the memo controller means is for controlling, in response to detection of a first electrical signal provided by the transceiver, the secure transaction means to switch from being in the first power state to being in the second power state, without changing a power state of the memory means.

* * * * *

UNITED STATES PATENT AND TRADEMARK OFFICE
CERTIFICATE OF CORRECTION

PATENT NO.         : 8,121,543 B2
APPLICATION NO.    : 12/317581
DATED              : February 21, 2012
INVENTOR(S)        : Virtanen It is certified that error appears in the above-identified patent and that said Letters Patent is hereby corrected as shown below:

Claim 14, col. 9, line 40 delete "memo circuit" and insert --memory circuitry--.

Claim 22, col. 10, line 50 delete "memo" and insert --memory--.

Claim 22, col. 10, line 51 delete "memo" and insert --memory--.

Signed and Sealed this
Eighth Day of May, 2012

David J. Kappos
*Director of the United States Patent and Trademark Office*